(12) United States Patent
Henry et al.

(10) Patent No.: US 9,512,709 B2
(45) Date of Patent: Dec. 6, 2016

(54) MULTIPHASE FLOW METERING SYSTEM

(71) Applicant: Invensys Systems Inc., Foxboro, MA (US)

(72) Inventors: Manus P. Henry, Oxford (GB);
Richard P. Casimiro, North Kingstown, RI (US)

(73) Assignee: Invensys Systems, Inc., Foxboro, MA (US)

( * ) Notice: Subject to any disclaimer, the term of this patent is extended or adjusted under 35 U.S.C. 154(b) by 199 days.

(21) Appl. No.: 14/135,085

(22) Filed: Dec. 19, 2013

(65) Prior Publication Data
US 2014/0137643 A1 May 22, 2014

Related U.S. Application Data

(63) Continuation of application No. 14/084,245, filed on Nov. 19, 2013.

(60) Provisional application No. 61/728,224, filed on Nov. 19, 2012, provisional application No. 61/825,872, filed on May 21, 2013.

(51) Int. Cl.
*G01F 1/78* (2006.01)
*E21B 47/00* (2012.01)
*E21B 47/10* (2012.01)
*G01F 1/84* (2006.01)
*E21B 21/06* (2006.01)

(52) U.S. Cl.
CPC ............ *E21B 47/00* (2013.01); *E21B 21/063* (2013.01); *E21B 47/10* (2013.01); *G01F 1/78* (2013.01); *G01F 1/8468* (2013.01)

(58) Field of Classification Search
CPC ............ G01F 1/66; G01F 1/74; G01F 1/8468; E21B 21/063; E21B 47/00; E21B 47/10

USPC .......................... 73/152.29, 152.31; 702/100
See application file for complete search history.

(56) References Cited

U.S. PATENT DOCUMENTS

| | | | | |
|---|---|---|---|---|
| 6,655,221 B1 * | 12/2003 | Aspelund | ............... | G01F 1/363 73/861.04 |
| 7,059,199 B2 * | 6/2006 | Mattar | ..................... | G01F 1/74 73/861.356 |
| 7,188,534 B2 * | 3/2007 | Tombs | ..................... | G01F 1/74 73/861.356 |

(Continued)

OTHER PUBLICATIONS

Christos E. et al., Uncertainty estimation and Monte Carlo simulation method, Jan. 2001, Elsevier Science Ltd., (Dec. 2001) 291-298.*

*Primary Examiner* — Hezron E Williams
*Assistant Examiner* — Gedeon M Kidanu
(74) *Attorney, Agent, or Firm* — Stephen Manetta; Ralph Graham

(57) ABSTRACT

A multi-phase flow metering system for measuring a multi-phase fluid including oil, water, and gas, includes a Coriolis mass flow meter adapted to measure mass flow rate and density of the multi-phase fluid. The system has a water cut meter adapted to measure the water cut of the multi-phase fluid. A processor is configured to determine the oil mass flow rate of the oil, water mass flow rate of the water, and gas mass flow rate of the gas using the mass flow rate and density from the Coriolis meter and the water cut from the water cut meter. The processor is further configured to determine dynamic estimates of the uncertainty of each of the oil mass flow rate, water mass flow rate, and gas mass flow rate.

1 Claim, 11 Drawing Sheets

(56) References Cited

U.S. PATENT DOCUMENTS

| | | | |
|---|---|---|---|
| 7,698,954 B2 * | 4/2010 | Tombs | G01F 1/74 73/861.356 |
| 8,117,921 B2 * | 2/2012 | Tombs | G01F 1/74 73/861.356 |
| 2002/0123852 A1 * | 9/2002 | Gysling | G01F 1/74 702/100 |
| 2005/0193832 A1 * | 9/2005 | Tombs | G01F 1/74 73/861 |
| 2008/0034892 A1 * | 2/2008 | Tombs | G01F 1/74 73/861.356 |
| 2008/0148867 A1 * | 6/2008 | Nyfors | G01F 1/40 73/861.63 |
| 2011/0016988 A1 * | 1/2011 | Tombs | G01F 1/74 73/861.356 |
| 2012/0118077 A1 * | 5/2012 | Henry | G01F 1/74 73/861.354 |

* cited by examiner

MULTIPHASE FLOW METERING SYSTEM

CROSS-REFERENCE TO RELATED APPLICATIONS

This application is a continuation of U.S. application Ser. No. 14/084,245, filed Nov. 19, 2013, and titled NET OIL AND GAS WELL TEST SYSTEM, which claims the benefit of U.S. Provisional Application No. 61/728,224, filed Nov. 19, 2012, and U.S. Provisional Application No. 61/825,872, filed May 21, 2013 and titled NET OIL AND GAS WELL TEST SYSTEM, the entire contents of which are each incorporated by reference.

FIELD OF THE INVENTION

The present invention generally relates to systems and methods for measuring fluids produced from oil and gas wells and more particularly to such systems and methods that use multiphase flow meters, such as multiphase Coriolis meters, to measure flow of oil, gas, and water from oil and gas wells. Some aspects of the invention relate more generally to measurement of multiphase fluid flow and also have applications outside the oil and gas industry.

BACKGROUND

Various different flowmeters are used in the oil and gas industry to provide information about the fluids produced by oil and gas wells. One such flowmeter is a Coriolis flowmeter. As is known to those skilled in the art, a Coriolis flowmeter includes a vibrating flowtube through which the process fluid passes and an electronic transmitter. The transmitter maintains flowtube vibration by sending a drive signal to one or more drivers and performs measurement calculations based on signals from two sensors. The physics of the device dictates that Coriolis forces act along the measurement section between sensors, resulting in a phase difference between the sinusoidal sensor signals. This phase difference is essentially proportional to the mass flow rate of the fluid passing through the measurement section. Thus, the phase difference provides a basis for a mass flow measurement of fluid flowing through the flowtube. The frequency of oscillation of the flowtube of a Coriolis meter varies with the density of the process fluid in the flowtube. The frequency value can be extracted from the sensor signals (for example by calculating the time delay between consecutive zero crossings) so that the density of the fluid can be obtained. The flowtube temperature is also monitored to enable compensation for variations in flowtube stiffness that may affect the oscillation frequency.

Coriolis meters are widely used throughout various different industries. The direct measurement of mass flow is frequently preferred over volumetric-based metering, for whereas the density and/or volume of a material may vary with temperature and/or pressure, mass remains unaffected. This is particularly important in the oil and gas industry, where energy content and hence product value is a function of mass.

A Coriolis meter measuring two parameters—mass flow and density—is theoretically able to resolve a two-phase (liquid/gas) mixture. However, unless simplifying assumptions are made, a Coriolis meter cannot on its own resolve the general three-phase oil/water/gas mixture that characterizes most oil well production. Including a third measurement of the fluid flow, such as water cut, (the proportion of water in the liquid mixture, typically scaled between 0% and 100%), enables true three-phase metering to be achieved. The term 'Net Oil' is used in the upstream oil and gas industry to describe the oil flow rate within a three-phase or a liquid (oil/water) stream. A common objective in the oil and gas industry is to determine the net oil produced by each well in a plurality of wells because this information can be important when making decisions affecting production from an oil and gas field and/or for optimizing production from an oil and gas field.

A conventional oil and gas well test system is shown in FIG. 1. In this well test system, one well from a plurality of wells (i.e., a cluster of N wells) is introduced into a test separator at any one time, while the remaining wells (i.e., N−1) are combined for transport to the production facility. The output of the selected well is separated in order to derive volumetric flow rates of the oil and gas being outputted from the selected well. The gas-liquid test separator flow path may be substantially different from that of the same well using the "bypass" route. Therefore, the well production in the test separator flow path may not be truly representative of its production the majority of the time when it is following the bypass route.

The present inventors have made various improvements, which will be described in detail below, applicable to the field of Coriolis flowmeters and applicable to the field of net oil and gas testing.

SUMMARY

An oil and gas well test system includes first and second measurement systems (e.g., a Coriolis-based measurement system) and a plurality of valves for connecting each of a plurality of wells of a cluster to one of the first and second measurement systems. The state of the valves can be switched to selectively change which of the measurement systems is in fluid communication with a selected well. A controller of the system is configured to calculate a parameter (e.g., volume or mass flow) of an output of the well that is associated with a valve that has been switched, based on the received default and switched data from the first and second measurement systems. A method of calculating the parameter is also disclosed.

Another aspect of the invention is a measurement controller for determining a parameter of an output from each individual well in a set of wells. The measurement controller includes a measurement controller including a processor and a memory. The measurement controller is adapted for communication with a plurality of valves, each of which is configured for fluid communication with one of the individual wells, and first and second net oil and gas measurement systems. The measurement controller is configured to: (i) receive default data from the first and second net oil gas measurement systems when a first valve of the plurality of valves is in a first state and fluidly connects the corresponding well to the first net oil and gas measurement system, and a second valve of the plurality of valves is in a second state and fluidly connects the corresponding well to the second net oil and gas measurement system; (ii) switch the first valve from the first state to the second state so that the first valve fluidly connects the corresponding well to the second net oil and gas measurement system; (iii) receive switched data from the first and second net oil gas measurement systems after switching the first valve from the first state to the second state; and (iv) calculate a parameter of an output of the well that is associated with the first valve based on the received default and switched data.

Another aspect of the invention is a method of assessing flow from a set of oil and gas wells. The method includes flowing output from a first subset of the wells collectively to a first flow measurement system through a first conduit while flowing output from a second subset of the wells collectively to a second flow measurement system through a second conduit different from the first conduit. Total flow through the first flow measurement system and total flow through the second measurement system are measured. Output from said individual well is re-routed from one of said first and second measurement systems to the other of said first and second measurement systems. Total flow through at least one of the first and second measurement systems is measured after the re-routing. A difference between the total flow rate before the re-routing and after the re-routing is used to assess flow rate from said individual well.

Still another aspect of the invention is a multi-phase flow metering system for measuring a multi-phase fluid including oil, water, and gas. The system includes a Coriolis mass flow meter adapted to measure mass flow rate and density of the multi-phase fluid. The system has a water cut meter adapted to measure the water cut of the multi-phase fluid. A processor is configured to determine the oil mass flow rate of the oil, water mass flow rate of the water, and gas mass flow rate of the gas using the mass flow rate and density from the Coriolis meter and the water cut from the water cut meter. The processor is further configured to determine dynamic estimates of the uncertainty of each of the oil mass flow rate, water mass flow rate, and gas mass flow rate.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
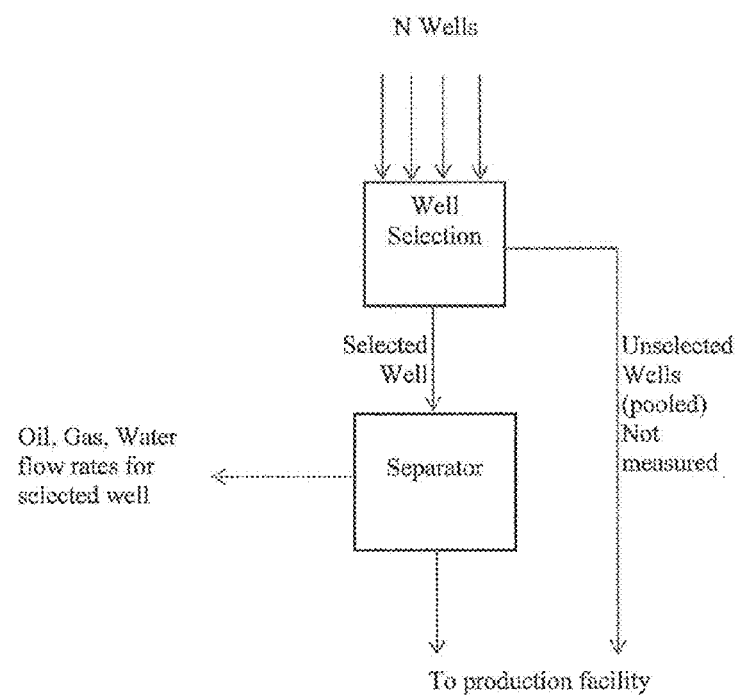
FIG. 1 is schematic diagram illustrating a conventional oil and gas well test system.
Figure 2:
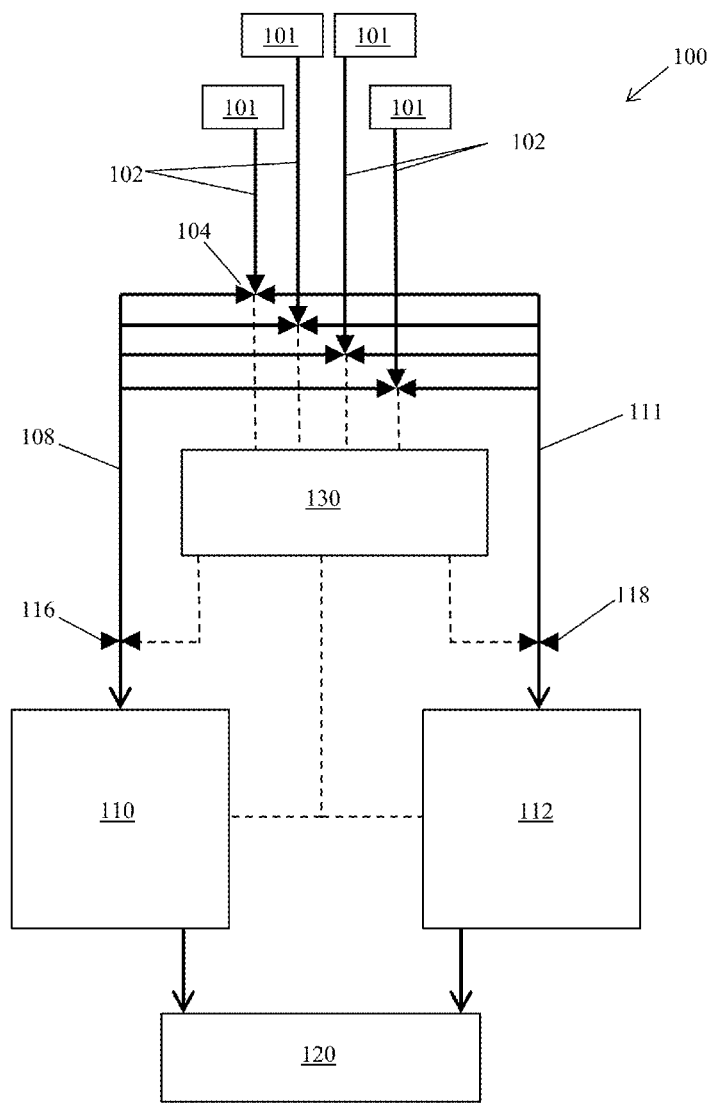
FIG. 2 is a schematic diagram of one embodiment of an oil and gas well test system.

Referring to FIG. 2, one embodiment of an oil and gas well test system is generally indicated at 100. The oil and gas well test system 100 includes a plurality of well-output conduits 102 (e.g., pipes) fluidly connected to a set of N wells 101. Although there are 4 wells 101 illustrated in FIG. 2, the number of wells N in a set can vary. The wells 101 are typically a cluster of wells producing from the same oil and gas reservoir and/or sharing a common production facility 120. Each well output conduit 102 is suitably connected to a single well 101 so the fluids produced by each individual well are isolated in the corresponding conduit 102. Each well-output conduit 102 is in fluid communication with one of a plurality of valves 104 (e.g., a plurality of 3-way valves). For reasons explained below, each valve 104 is independently configurable between a first state, in which the valve fluidly connects the corresponding well-output conduit 102 to a first inlet conduit 108 to direct fluid flow to a first net oil and gas measurement system 110, and a second state, in which the valve fluidly connects the corresponding well-output conduit to a second inlet conduit 111 to direct well flow to a second net oil and gas measurement system 112. The output from each well 101 in the set can be selectively routed to either of the oil and gas measurement systems 110, 112, independently of the output from the other wells. After flowing through the first and second net oil and gas measurement systems 110, 112, the well flow may be delivered to the production facility 120. The sum of the flow through the first and second net oil and gas measurement systems 110, 112 is essentially the combined flow of fluids produced from all N wells. The oil and gas well test system 100 may also include a first pressure regulation valve 116 fluidly connecting the first inlet conduit 108 to the first net oil and gas measurement system 110, and a second pressure regulation valve 118 fluidly connecting the second inlet conduit 112 to the second net oil and gas measurement system 114.

Each of the first and second net oil and gas measurement systems 110, 112, respectively, may include a Coriolis flowmeter system (also referred to as a "Coriolis-based net oil metering skid") that allows the measurement of gas, oil and water directly from the wellhead without first separating the components using the conventional gas-liquid separator. This Coriolis-based metering skid can provide several advantages over the separator-based oil and gas well test system, including, but not limited to 1) not requiring separation of the output, so that natural flow pattern of the well is more readily captured, 2) accurate flow rates can be captured in minutes, rather than hours, and 3) it facilitates a smaller footprint and reduced maintenance compared to conventional well test systems. It is understood that each of the first and second net oil and gas measurement systems 110, 112 may include a different type of flowmeter system, including a flowmeter system having a gas-liquid separator within the scope of the invention. The first and second net oil and gas measurement systems can be identical, as is the case in the illustrated embodiment, but it is also recognized that this is not required within the broad scope of the invention.

An example of one embodiment of a Coriolis-based metering skid for use in the well test systems 110, 112 is the Foxboro® multiphase measurement net oil and gas solution available from Invensys Systems, Inc. A detailed description of a Coriolis net oil skid is also provided in U.S. Pre-grant Patent Application Publication No. 20120118077, the contents of which are hereby incorporated by reference. In general, the net oil skid includes a conduit through which the fluid from the well flows; a Coriolis flowmeter for measuring mixture density and mass flow rate of liquid and gas; a water cut meter for measuring the percentage of water in the liquid; and a multi-variable pressure and temperature sensor for measuring pressure and temperature for gas density reference are in fluid communication with the conduit.

Figure 3:
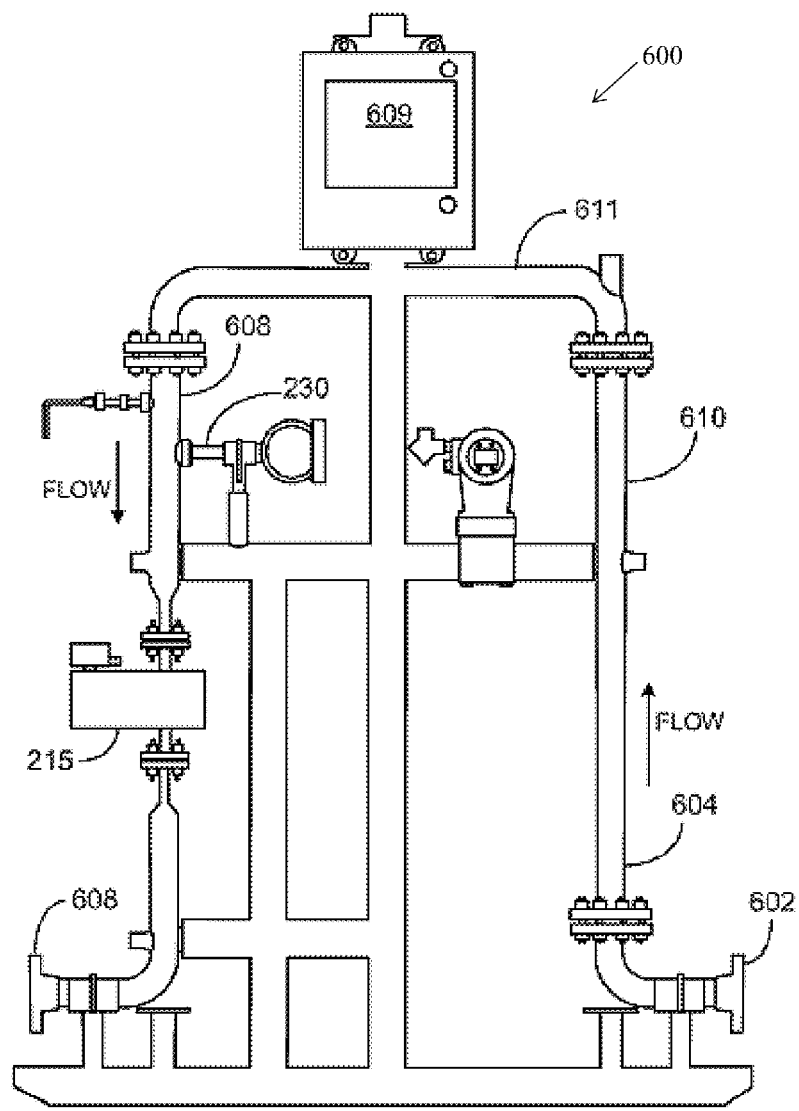
FIG. 3 is a side elevation of one embodiment of a net oil skid suitable for use in the oil and gas well test system of FIG. 2.

One embodiment of a suitable net oil skid that can be used as a measurement system is illustrated in FIG. 3. The skid 600 is mechanically designed to condition the process fluid flow to minimize slip between gas and liquid via the rise and fall of the pipework, and by an integrated flow straightener in the horizontal top section. In this embodiment, a liquid fraction probe 230 is plumbed in series with a multiphase Coriolis flowmeter 215 between the system inlet 602 and outlet 608. The liquid fraction probe 230 is suitably a watercut meter (or watercut probe) that measures and provides an estimate of the fraction of water in the fluid that flows through it. The fraction of water may be referred to as the water cut. The system 600 also includes an interface module 609, which may include an electronic processor, an electronic storage (such as a memory), and one or more input/output modules (such as a display, a communications interface for connection to a transmitter in communication with the Coriolis flowmeter 215 and/or connection with the liquid fraction probe 230, and/or for connection to a remote terminal (not shown), and a tactile manual input, such as a keyboard and a mouse). Together, the multiphase Coriolis meter 215 and liquid fraction probe 230 are able to measure flow rate of water, oil, and gas in a mixture containing all three of these constituents as they are received in a multi-phase flow from one or more of the wells 101.

In the system 600, the Coriolis flowmeter 215 is positioned and arranged such that the fluid flows through the Coriolis flowmeter in a downward direction that corresponds to the direction of gravity. In the example shown in FIG. 3, the liquid fraction probe 230 and the Coriolis flowmeter 215 are in a downward orientation on a downward leg of the skid 600. Placement of the liquid fraction probe 230 and the Coriolis flowmeter 215 in a downward orientation on the downward leg of the skid 600 may be beneficial in low pressure, high GVF applications, such as may be encountered in some oil and gas wells, especially mature wells producing from depleted reservoirs. For example, as compared to a system in which the Coriolis flowmeter is oriented such that fluid flows in the upward direction, arranging the system so fluid flows downward through the Coriolis flowmeter 215 may result in the Coriolis flowmeter draining more effectively. Additionally, separation of gas and liquid phases of the multi-phase fluid may occur naturally on the upward leg 610 of the skid 600 because gas passes through the flowtube 215 at any time, whereas liquid tends to collect in the upward leg 610 until a sufficiently large slug of liquid is capable of passing through a top section 611 of the skid 600 to the downward leg 608. Once the liquid has passed through the Coriolis flowmeter 215, gravity acts to minimize, or eliminate, liquid flow back into the flowtube 215. In some implementations, a device to further minimize backwash into the flowtube 215, such as a non-return valve (not shown), may be included in the skid 600.

Additionally, an arrangement such as shown in FIG. 3 may reduce the possibility of the Coriolis flowmeter 215 being in a partially filled state (or partially filled condition). For example, when liquid flow completely or nearly stops, as may occur for extended periods of time for a low-producing oil and gas well, unless the Coriolis flowmeter 215 drains completely, the flowtube 215 may enter a partially filled state. While in a partially filled state, the flowtube 215 may produce a spurious (inaccurate), non-zero mass flow reading, which in turn may lead to false readings of oil and water flows through the system 600. However, the arrangement shown in FIG. 3 reduces or eliminates the possibility of liquid being trapped within the flowtube of the Coriolis meter 215, thus reducing or eliminating the occurrence of a partially filled state and the effects of a partially filled state.

Figure 4:
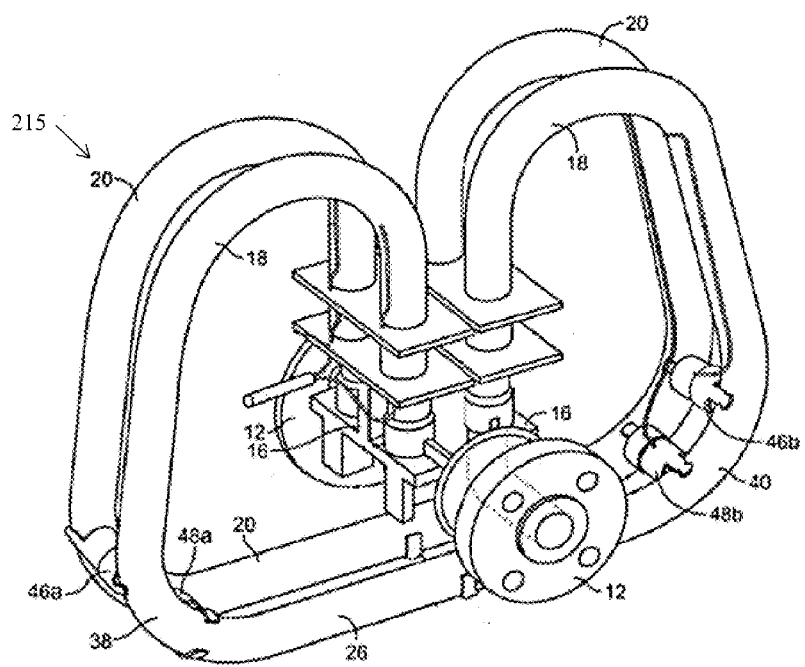
FIG. 4 is a perspective of one embodiment of a Coriolis meter suitable for use in the net oil skid of FIG. 3 and for use in the oil and gas test system illustrated in FIG. 2.
Figure 5:
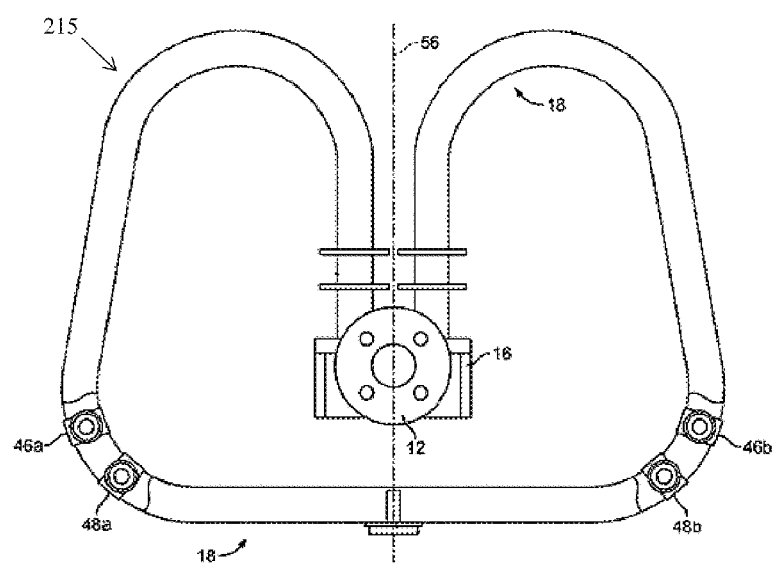
FIG. 5 is a side elevation of the Coriolis meter shown in FIG. 4.

One embodiment of a Coriolis flowmeter, generally designated 10, is illustrated in FIGS. 4 and 5. The flowmeter 10 includes one or more conduits 18, 20 (also referred to as a flowtube), one or more drivers 46a, 46b for driving oscillation of the conduit(s), and a pair of motion sensors 48a, 48b that generate signals indicative of the oscillation of the conduit(s). In the illustrated embodiment, there are two conduits 18, 20 two drivers 46a, 46b and two motion sensors 48a, 48b and the drivers and motions sensors are positioned between the conduits so each driver and motion sensor is operable for both of the conduits. It is understood by those skilled in the art that a Coriolis flowmeter may have only a single conduit and/or may have a single driver. It is also understood the conduits) may have different configurations than the conduits 18, 20 in the illustrated embodiment.

As illustrated in FIGS. 4 and 5, the flowmeter 215 is designed to be inserted in a pipeline (not shown) having a small section removed or reserved to make room for the flowmeter. The flowmeter 215 includes mounting flanges 12 for connection to the pipeline, and a central manifold block 16 supporting the two parallel planar loops 18 and 20 which are oriented perpendicularly to the pipeline. The drivers 46a, 46b and sensors 48a, 48b are attached between each end of loops 18 and 20. The drivers 46a, 46b on opposite ends of the loops 18, 20 are energized by a digital controller (not shown) with current of equal magnitude but opposite sign (i.e., currents that are 180° out-of-phase) to cause straight sections 26 of the loops 18, 20 to rotate about their co-planar perpendicular bisector 56 (FIG. 5). Repeatedly reversing (e.g., controlling sinusoidally) the energizing current supplied to the drivers 46a, 46b causes each straight section 26 to undergo oscillatory motion that sweeps out a bow tie shape in the horizontal plane about the axis 56 of symmetry of the loops. The entire lateral excursion of the loops at the lower rounded turns 38 and 40 is small, on the order of 1/16 of an inch for a two foot long straight section 26 of a pipe having a one inch diameter. The frequency of oscillation is typically about 80 to 90 Hertz, although this can vary depending on the size and configuration of the flowtube(s).

As will be understood by those skilled in the art, the Coriolis effect induces a phase difference between the two sensors 48a, 48b that is generally proportional to mass flow rate. Also, the resonant frequency of the loops 18, 20 will vary as a function of density of the fluid flowing therethrough. Thus, the mass flow rate and density can be measured. The exploitation of new technology, such as audio quality analog-to-digital convertors and digital-to-analog convertors (ADCs and DACs) and Field Programmable Gate Arrays (FPGAs), has facilitated the development of new capabilities for Coriolis meters, such as the ability to deal with multiphase flows. Various corrections can be applied to the basic measurement resulting from the phase difference between the sensors. For example, multiphase flow introduces highly variable damping on the flowtube, up to three orders of magnitude higher than in single phase conditions, requiring agile and precise drive control. In addition, the mass flow and density measurements generated under multiphase flow conditions are subject to large systematic and random errors, for which correction algorithms can be defined and implemented. Further details concerning operation of Coriolis flowmeters is provided in U.S. Pat. Nos. 6,311,136; 6,505,519; 6,950,760; 7,059,199; 7,188,534; 7,614,312; 7,660,681; and 7,617,055, the contents of which are hereby incorporated by reference.

The Coriolis meter 215 and liquid faction probe 230 communicate with a net oil computer, such as the interface module 609 of the skid 600, that calculates a totalized net oil flow rate, water flow rate, and gas flow rate in mixed liquid/gas calculated in standard volume. The metrology of three-phase flow is complex, and in reality the uncertainty of each measurement varies dynamically with the operating point, as well as the metering technology, and other aspects. A dynamic uncertainty analysis of the three-phase measurements would facilitate extending the range of operating conditions under which guaranteed measurement performance could be provided. One way to achieve a three-phase flow uncertainty analysis is through the use of Monte-Carlo Modeling. The following will explain how to provide an on-line assessment of the uncertainty of the three-phase measurements, conforming to the SEVA concept, as specified in the British Standard BS-7986, as well as the international standard known as the GUM—the Guide to the Expression of Uncertainty in Measurement.

Multiphase flow regimes of oil, water and gas can present challenges for accurately measuring the flow rates of the liquid and gas components with a Coriolis mass flow meter 215 and Water-Cut meter 230 based multiphase metering system. Specifically, variations in the flow regime can create a slip condition where the flowing velocity of the compressed gas phase can vary significantly from that of the oil and water liquid phase, rendering accurate metering more difficult. As noted above, the skid 600 is designed to minimize this slip condition but there can still be slip between the gas and liquid phases.

Further challenges are presented as the Water-Cut meter 230 necessitates a well-mixed oil and water flow stream to achieve desired measurement accuracy of the water cut or percent of water in the oil and water flow stream. Where the flow regime result in significant slugging, it is important to preventing the meter from being subject to positive and then negative flow conditions, as would occur if the meter 230 were positioned on the inlet side of the skid 600. It is further important to ensure that the meter 230 is properly drained, as it can be difficult to distinguish between true multi-phase flow and the potentially large flow and density errors induced by the partially filled conditions when there is no genuine flow passing through the meter. This can be alleviated by using a multiphase metering system design and implementation in which the potential slip condition between gas and liquid phases is minimized to maintain a conditioned flow profile, where the Coriolis mass flow meter 215 measures liquid and gas phases at normalized flow velocities. It is also helpful to facilitate good mixing of oil and water liquid phases to maintain a homogeneous flow regime at the point of Water-Cut meter measurement.

Figure 6:
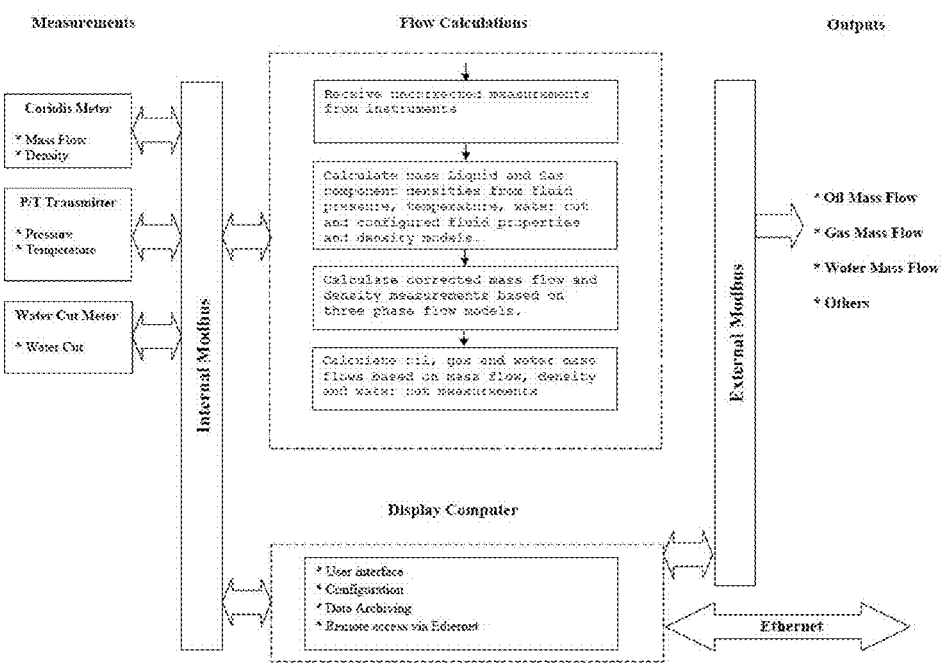
FIG. 6 is a schematic diagram illustrating some of the electronic architecture of the net oil skid of FIG. 3.

Other instrumentation on the skid 600 consists of the water cut meter and a pressure and temperature transmitter (not shown). The latter reads the pressure at the inlet to the Coriolis meter 215 and the temperature of an RTD (resistance temperature detector) sensor in a thermal well, positioned at the top of the skid 600. The Hardware/Software architecture of the skid 600 is shown in FIG. 6. As illustrated the Communications/Compute Unit (e.g., unit 609 on FIG. 3) acts as a communication master for all the devices, using the Modbus RTU industrial communications protocol, commonly used in the oil and gas industry. The compute unit 609 performs three-phase flow measurement calculations based on the data received, provides a user interface (for providing, for example, gas and fluids density information) and also carries out data archiving. Real-time data is provided to the user's data acquisition system via a Modbus interface, with an update rate of 1 second.

As illustrated there are three communication interfaces: an internal Modbus for the skid 600 instrumentation, an external Modbus interface to provide measurement values to the user, and an Ethernet interface to enable remote configuration, monitoring and archival data retrieval. The Display Computer further provides a user interface to enable local configuration, data display, etc.

FIG. 6 further shows an overview of one embodiment of a flow calculation algorithm. The uncorrected data from the instruments is gathered via the internal Modbus interface. Here, 'uncorrected' refers to the effects of multi-phase flow: the mass flow, density and water cut readings are calculated based on their single-phase calibration characteristics. The liquid and gas densities are calculated based on the temperature, pressure and water cut readings and configuration parameters, based on data provided by the user. Corrections are applied to the Coriolis meter mass flow and density readings based on the three-phase flow measurement models. Finally, the oil, water and gas measurements are calculated from the corrected mass flow, density and water cut.

Figure 7:
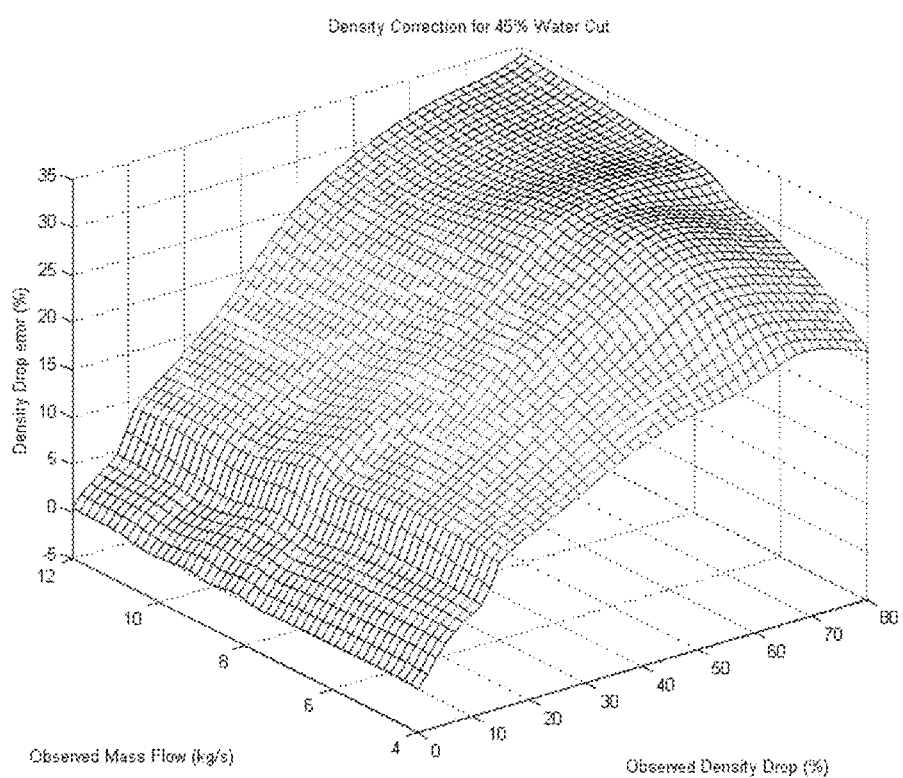
FIG. 7 is a graph illustrating one example of a relationship between observed mass flow rate, observed density drop, and a density drop error that can be used to provide improved measurements using the Coriolis meter of FIGS. 4 and 5.

The corrections to the mass flow and density readings are implemented using neural networks, based on internally observed parameters. One important parameter is the density drop, i.e. the difference between the pure liquid density (for a particular water cut value) and the observed density of the gas/liquid mixture. For example, FIG. 7 shows a 3-D visualization of the observed density drop error against the observed mass flow and density drop, keeping other parameter values constant (e.g. the water cut is 45%). Here zero density drop indicates no gas present and, as would be expected, results in no density error. Models based on laboratory experimental data are used to provide on-line corrections for the mass flow and density readings.

Figure 8:
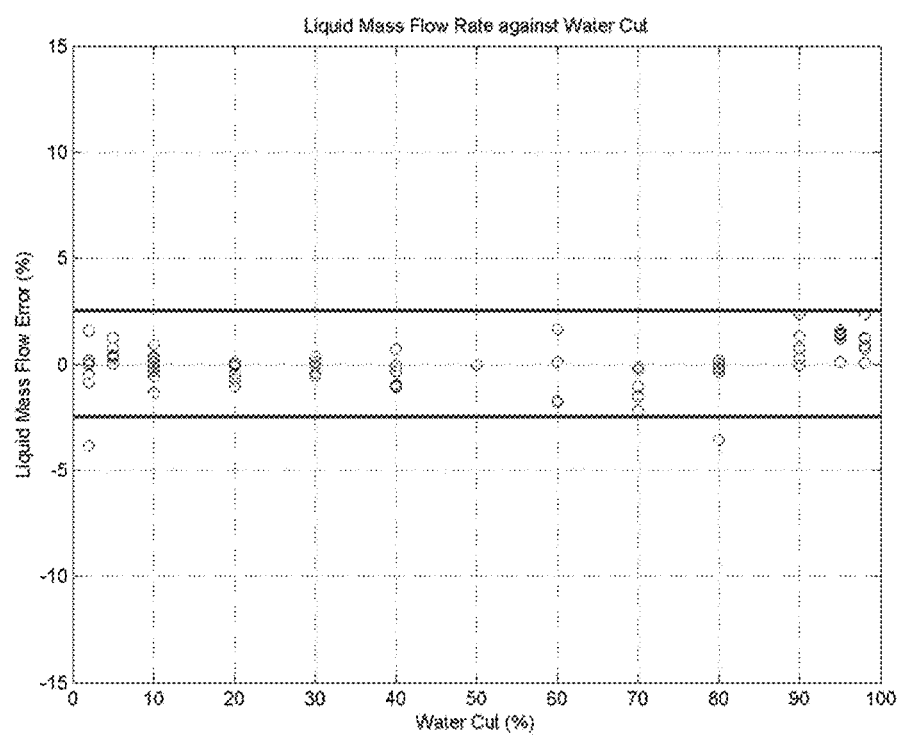
FIG. 8 is a graph illustrating low liquid mass flow error as the water cut of a multiphase flow is varied across a wide range of values between 0 and 100 percent.

Such models can be used to achieve compliance with oil industry standards over a wider range of flow conditions. For example, the Russian Standard GOST 8.165 [2] has the following key specifications:
  Total liquid flow accuracy requirement±2.5%
  Total gas flow accuracy requirement±5.0%
  Total oil flow accuracy requirement dependent upon water cut:
    For water cuts<70%, oil accuracy requirement±6.0%
    For water cuts>70% and <95%, oil accuracy requirement±15.0%
    For water cuts>95%, no oil accuracy requirement is specified, but an indication of performance may be given Trials have taken place on the skid 600 at the UK national flow laboratory, NEL, in Glasgow, and at the Russian national flow laboratory, VNIIR in Kazan. The resulting performance matches the GOST requirements, and the skid 600 has been certified for use in Russia. For example, FIG. 8 shows the liquid mass flow errors from 75 formal trials at NEL, over the full range of water cuts, where the specified accuracy requirement is ±2.5%. Typically, formal trials at laboratories are carried out at steady state conditions. For example, in FIG. 8, each test result is based on a five minute trial where all reference conditions are kept constant. The advantage of testing at steady state is that it reduces the uncertainty of the reference flow rates so that the performance of the skid 600 can be accurately assessed at specific operating points.

In practice, a desired accuracy (uncertainty) performance can only be achieved over a limited range of conditions. For example the maximum total liquid flowrate achievable through the skid 600 is likely to be determined by pressure drop considerations; conversely the minimum total liquid flowrate is likely to be constrained by the accuracy performance of the skid 600 at low flow. With three-phase flow, there are many dimensions to consider in specifying the operating envelope for acceptable measurement uncertainty. For example, as the water cut increases towards 100%, it becomes increasingly difficult to measure the absolute oil flow rate to within ±6.0%; in this case the GOST standard varies the oil flow rate accuracy requirement with the water cut, as discussed above. But no such provision is made for the gas flow measurement, which is required to be accurate to within 5% in all cases. As the gas volume fraction (GVF) tends to zero, it becomes increasingly difficult to meet this requirement.

For example, consider a mixture of pure water and gas, where the water density is taken as 1000 kg/m3, the gas density at line temperature and pressure is 5 kg/m3, and the GVF is 5%. Then in every cubic meter of gas/liquid mixture, there are 950 kg of water, and only 250 g of gas; the GOST standard requires the latter is to be measured to within ±12.5 g. To achieve this resolution for gas dispersed within 950 kg of water is extremely challenging, although this performance was successfully achieved by the skid 600 in trials at NEL.

Testing performance with static flow conditions in laboratories can thus be used to set limits on the range of parameters over which the skid 600 can deliver the required accuracy performance. In practice, the accuracy of each of the oil, water and gas flow measurements may vary dynamically with the operating point (e.g. water cut, GVF and liquid mass flow rate) as well as other conditions (e.g. process noise).

Figure 9:
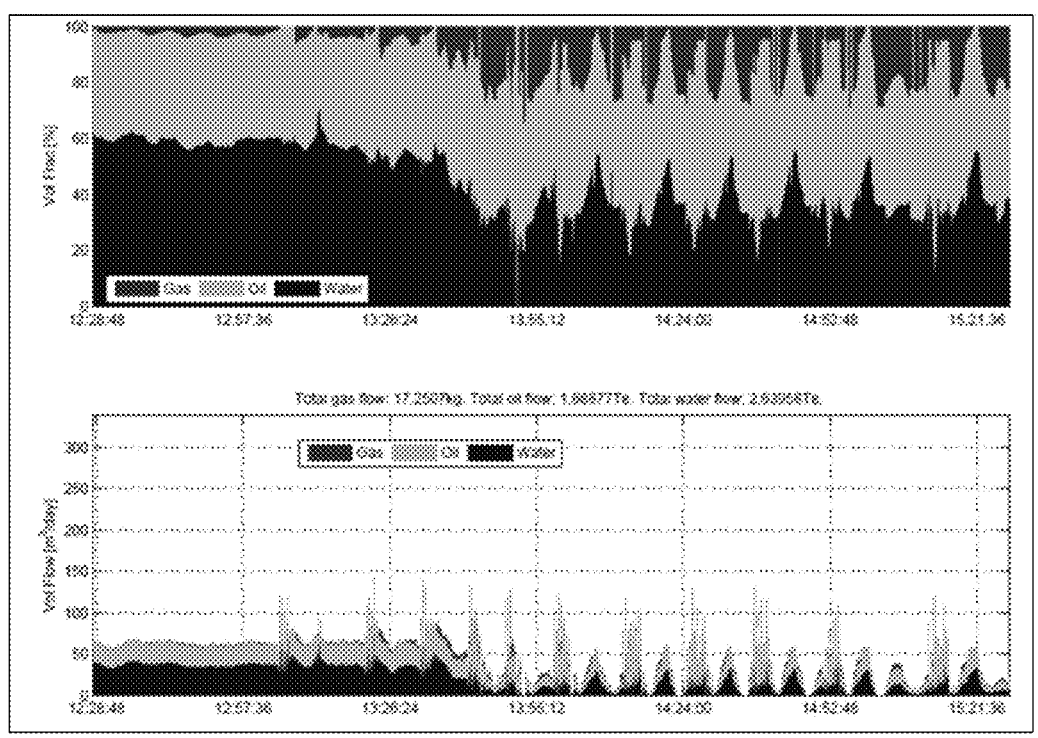
FIG. 9 is a display showing a time-varying void fraction for each of the constituents of a multiphase flow in the upper portion of the display and a corresponding time varying flow rate of gas, oil, and water measured from the multiphase flow.
Figure 10:
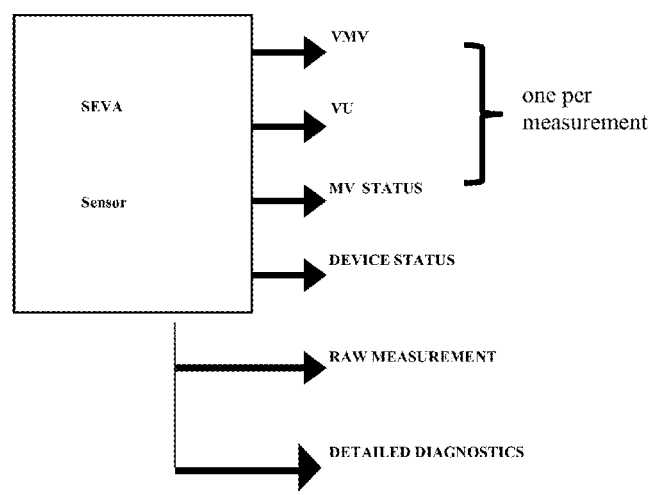
FIG. 10 is a schematic diagram illustrating one embodiment of a self-validating sensor.

Furthermore, real oil and gas wells often exhibit dynamic behavior. For example, FIG. 9 shows data from a field trial of the skid 600 over the course of a three hour test. The upper graph shows the proportion by volume of free gas, oil and water in the produced fluid, while the lower graph shows the absolute volumetric flow rates. Here the well flow rate and composition shows significant dynamic variation in water cut, GVF, and liquid flow rate.

One major advantage of the skid 600 over conventional separator technology is that it provides dynamic measurements, as opposed to simple totalized flows over a period several hours. Data on the dynamics of flow are potentially useful to reservoir engineers for understanding the evolving state of the oilfield.

Conventionally, it is assumed that as long as the operating conditions fall within the specification of the certification (e.g., GOST) throughout the entire well test period, then the measurement accuracy can be considered to be within the specified limits (e.g., 5% for gas flow). A more pragmatic and flexible approach is to assert that, for a particular well test, as long as the operating conditions averaged over the duration of the test fall within the specification of the certification standard, then nominal accuracy can be assumed.

An alternative approach is to provide a dynamic uncertainty analysis for each measurement value, as a function of the operating conditions, process noise and other influencing factors. With this approach, the overall uncertainty of each measurement is estimated, based upon its dynamic behavior over the course of the well test period. In particular, this approach can facilitate the demonstration of acceptable levels of uncertainty over wider ranges of operating conditions than for a purely static analysis. For example, if the liquid flowrate drops below the threshold for acceptable accuracy based on a static analysis, a dynamic uncertainty analysis can demonstrate that the contribution of this low flow to the overall uncertainty of entire test period may be small, and that the overall well test total flow remains within specification. Thus developing a dynamic uncertainty analysis for the skid 600 can result in acceptable uncertainty performance over a wider range of operating conditions than is possible using static, laboratory-based verification.

The Sensor Validation (SEVA) concept proposes a model of how a 'self-validating' or SEVA sensor should behave, assuming the availability of internal computing power for self-diagnostics, and of digital communications to convey measurement and diagnostic data. This model has been incorporated into the British Standard BS-7986 [6]. A generic set of metrics are proposed for describing measurement quality. For each measurement, three parameters are generated:

The Validated Measurement Value (VMV). This is the conventional measurement value, but if a fault occurs, the VMV is a corrected best estimate of the true value of the measurand;

The Validated Uncertainty (VU). This is the metrological uncertainty, or probably error, of the VMV. For example, if the VMV is 4.31 kg/s, and the VU is 0.05 kg/s, then the sensor is claiming that the true measurement value lies between 4.26 kg/s and 4.36 g/hour with the stated level of coverage (typically k=2, 95% probability); and The Measurement Value Status (MV Status). Given the requirement to provide a measurement, even when a fault has occurred, the MV Status indicates the generic fault state under which the current measurement value has been calculated.

One important aspect of the SEVA scheme is the generation of the Validated Uncertainty, a dynamic assessment of the uncertainty associated with each measurement value provided by the sensor. In the case of a complex instrument such as a Coriolis meter, the uncertainty of each measurement (e.g. the mass flow and density) is calculated separately within the instrument, and will vary dynamically with operating point, process noise and other parameters. On-line uncertainty can be used for a variety of purposes, such as deciding on control system behavior (e.g. whether to accept or reject the quality of the measurement value for the purposes of taking control decisions). Where measurements are combined (for example in forming mass balances or other higher level calculations), the SEVA scheme proposes the provision of a higher-level uncertainty analysis, where the dynamic uncertainty of the input measurements are used in the calculation of the uncertainty of the resulting measurement. Consistency checking between redundant SEVA measurements has also been developed.

Figure 11:
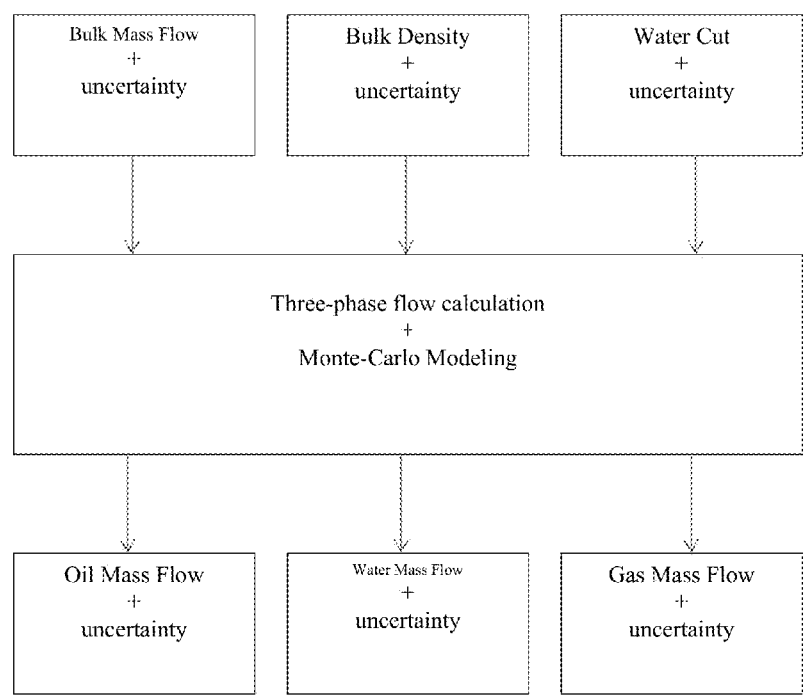
FIG. 11 is a schematic flow diagram of a system for providing uncertainty estimates for the constituents of a multiphase flow.

Dynamic assessments of the uncertainty of each measurement from the Coriolis meter, water cut meter and other sensors can be used to generate a corresponding on-line uncertainty assessment of the three-phase measurements of gas, water and oil flow, as indicated in FIG. 11.

In the Guide to the Expression of Uncertainty in Measurement or GUM, a number of techniques are described for calculating the uncertainty of an output variable from the values and uncertainties of input variables. In the case of a simple analytical relationship between inputs and output, formulaic expressions can be used. In more complex cases, where for example there may be correlation between input variables and/or the functional relationship is not readily expressed algebraically, Monte Carlo Modeling (MCM) can suitably be used. Monte Carlo Modeling is described in more detail JCGM. "JCGM 101:2008. Evaluation of measurement data—Supplement 1 to the "Guide to the expression of uncertainty in measurement"—Propagation of distributions using a Monte Carlo method", www.bipm.org, 2008, the contents of which are incorporated by reference. Given the complexity of the three-phase flow calculations, which includes neural net models, MCM is a suitable means of assessing output uncertainty for the skid 600. FIG. 11 illustrates this process, in which uncertainty from the mass flow and density measurements from the Coriolis meter 215 and uncertainty from the water cut measurement from the liquid fraction probe 230 are fed into a Monte Carlo algorithm along with the corresponding measurements to yield uncertainty for the flow rates of oil, gas, and water.

To briefly summarize the Monte Carlo method the measurement calculation is carried out multiple times, where in each case the input variables (e.g., mass flow rate, density, and water cut) are randomly selected based on their respective probability distributions. With a sufficient number of repeat calculations, it is possible to estimate the probability distribution of each output variable, and thereby to calculate a mean and coverage interval or uncertainty.

The GUM is primarily intended for static, off-line analyses. In section 7 of the GUM, where the number of Monte Carlo trials M is discussed, it is suggested that one million simulations might be appropriate to ensure a good approximation of the distribution of the output variable Y. This is clearly unlikely to be feasible in an on-line skid with a is update rate. Accordingly, one embodiment of a method of providing dynamic uncertainty analysis for the skid 600 includes:

- At the start of each new calculation period, mass flow, density, water cut, pressure, and temperature measurements are collected from the skid 600 instrumentation;
- Estimates of the uncertainties of each of these measurements are obtained either from the instruments themselves, or in the interface module 609 of the skid 600;
- Simple Gaussian distributions are assumed for the probability density functions. The only likely correlations are between the mass flow and density measurements—all others can be assumed to be independent;
- Monte-Carlo modeling simulation is done by performing between about 50 and about 100 three-phase measurement calculations where the input parameters for each calculation are randomly selected from their assumed Gaussian distributions;
- The resulting oil, water, and gas mass flow rates are assumed Gaussian, so that the best estimate and uncertainty of each flow rate can be calculated from the results of the Monte Carlo modeling simulation; and
- The totalized flow and its uncertainty are updated for each fluid type.

Even with only 50-100 MCM calculations per measurement update, this approach requires a substantial increase in the computing power resources for the skid 600 if it is to be implemented in real-time. However, the benefit is that the dynamic uncertainty analysis may enable assurances to be given that the overall measurement output of the skid 600 and the net oil and gas measurement systems based on the skid, such as systems 110 and 112 on FIG. 2 is within prescribed tolerances for error under one or more specific standards when such assurances could not be made without the dynamic uncertainty analysis.

Referring again to FIG. 2, in a first exemplary method of testing a well, the selection of wells between the first and second net oil and gas measurement systems 110, 112 is generally balanced so that the measurement systems receive approximately the same combined flowrate. One method of balancing the flow rate from the wells 101 includes the use of approximate, long-term production rates which are usually known for established wells. Using this information, the wells are listed in order of flow production from highest to lowest, assigning each an index number beginning with 1 for the highest flow rate, 2 for the next, and so on. Thus, as a non-limiting example, Table 1 (below) shows a cluster including 10 wells 101. Each of the 10 wells 101 includes a liquid flow rate (kg/s) determined from historical, long-terms production rates. The uncertainty (abbreviated "unc") is determined or estimated based on the accuracy of the measurement systems 110, 112.

TABLE 1

| Liquid Flows Rates of each Well | |
|---|---|
| Well No. | Flow Rate (kg/s) |
| 1 | 1.00 |
| 2 | 0.85 |
| 3 | 0.70 |
| 4 | 0.65 |
| 5 | 0.50 |
| 6 | 0.50 |
| 7 | 0.40 |
| 8 | 0.30 |
| 9 | 0.20 |
| 10 | 0.10 |
| Total Flow Rate | 5.20 (kg/s) |
| Uncertainty % | 1.00% |

After ranking the wells 101 from highest flow rate to lowest flow rate, the wells are grouped based on the first and second net oil and gas measurement systems 110, 112. For example, using the ranking set forth in Table 1, the wells are grouped as set forth in Tables 2 and 3 (below), where Table 2 relates to the first net oil and gas measurement system 110 and Table 3 relates to the second net oil and gas measurement system 112, and where a number 1 in the On/Off column means the well is in fluid communication with that measurement system via the respective valve 104, and a number 0 means the well is not in fluid communication with the measurement system. This ranking may be performed using software executed on a processor (e.g., controller 130, discussed below) or may be inputted manually by a user. In general the ranking and assigning of the wells to the measurement systems 110, 112 is done in a manner that results in some of the higher producing wells being assigned to each system 110, 112 and some of the lower producing wells being assigned to each system.

TABLE 2

| (First Net Oil and Gas Measurement System) | | | |
|---|---|---|---|
| Well No | Flow Rate (kg/s) | On/Off | Contribution (kg/s) |
| 1 | 1.00 | 1 | 1.00 |
| 2 | 0.85 | 0 | 0.00 |
| 3 | 0.70 | 1 | 0.70 |

TABLE 2-continued (First Net Oil and Gas Measurement System)

| Well No | Flow Rate (kg/s) | On/Off | Contribution (kg/s) |
|---|---|---|---|
| 4 | 0.65 | 0 | 0.00 |
| 5 | 0.50 | 1 | 0.50 |
| 6 | 0.50 | 0 | 0.00 |
| 7 | 0.40 | 1 | 0.40 |
| 8 | 0.30 | 0 | 0.00 |
| 9 | 0.20 | 1 | 0.20 |
| 10 | 0.10 | 0 | 0.00 |
| Total Flow Rate | | | 2.80 kg/s |
| Total Uncertainty % | | | 1.00% |
| Total Uncertainty | | | 0.028 kg/s |

TABLE 3

(Second Net Oil and Gas Measurement System)

| Well No | Flow Rate (kg/s) | On/Off | Contribution (kg/s) |
|---|---|---|---|
| 1 | 1.00 | 0 | 0.00 |
| 2 | 0.85 | 1 | 0.85 |
| 3 | 0.70 | 0 | 0.00 |
| 4 | 0.65 | 1 | 0.65 |
| 5 | 0.50 | 0 | 0.00 |
| 6 | 0.50 | 1 | 0.50 |
| 7 | 0.40 | 0 | 0.00 |
| 8 | 0.30 | 1 | 0.30 |
| 9 | 0.20 | 0 | 0.00 |
| 10 | 0.10 | 1 | 0.10 |
| Total Flow Rate | | | 2.40 kg/s |
| Total Uncertainty % | | | 1.00% |
| Total Uncertainty | | | 0.024 kg/s |

In one embodiment, the default or initial configuration of the system 100 may be controlled by a controller 130 (i.e., a device including a processor and a memory). It is understood that the term "controller" is not limited to a single device, but may include a plurality of control circuits or other hardware, which may or may not be packaged as a single unit, and may or may not being communication with one another. For example, each of the first and second measurement systems 110, 112 may include individual control circuits, and another control circuit may be in communication with the valves 104; however, together each of these control circuits or controllers constitutes the controller 130 (FIG. 2). The controller 130 may include software that is executed on the processor for using data to determine the rankings of the wells and for grouping the wells. Based on the determined groupings, the controller 130 communicates with valves 104 to configure the valves in accordance with the groupings. The connections between the controller 130 and various other components in FIG. 2 are illustrated with dashed lines. These connections may involve physical connections with electrical wires or may involve wireless communication components.

After determining and instituting the default configuration of the test system 100, the controller 130 determines the flow rate of each individual well by switching its flow from the default measurement system (e.g., measurement system 110) to the other measurement system (e.g., measurement system 112). In one example, to determine the flow rate of well 1 in Tables 1-3, the following steps are carried out by the controller 130 in one embodiment of the method:

(i) the current flow rates from the first and second measurement systems 110, 112 are recorded with all the wells in their default groups, averaged over a suitable duration (anything from 5 minutes to 24 hours depending upon application requirements); these flow rates can be taken for each of oil, water and gas; the flow rates are denoted below as 1A and 2A, with the understanding that each of oil, water, and gas are separately measured and calculated along with corresponding uncertainty estimates if desired;

(ii) the valves 104 are used to change the path of well 1 so that is now sent to the second measurement system instead of the first measurement system;

(iii) wait for a suitable settling time to allow the new flow pattern to become established (as discussed below);

(iv) the flow rates and uncertainty estimates from the first and second measurement systems 110, 112 in the new configuration are recorded and averaged over a suitable duration—denoted as 1B and 2B for the measurement systems 110, 112, respectively;

(v) the total flows (1A+2A) and (1B+2B)) for each of the two periods are compared to see whether the total flow was stable, and therefore whether a good estimate of the Well 1 flow can be made (e.g., if (1A+2A) is sufficiently close to (1B+2B) then a good estimate of Well 1 flow can be made);

(vi) estimates of the flow of Well 1, using (1A−1B)=$1^{st}$ estimate of flow, and (2B−2A)=$2^{nd}$ estimate of flow are calculated; and (vii) the mean/average of the $1^{st}$ and 2nd estimates is calculated, using $\{(1A-1B)+(2B-2A)\}/2$.

Tables 4 and 5 (below) show the flow rates using the corresponding valve 104 to switch well 1 from the first measurement system 110 to the second measurement system 112.

TABLE 4

| Well No | Flow Rate (kg/s) | On/Off | Contribution (kg/s) |
|---|---|---|---|
| 1 | 1.00 | 0 | 0.00 |
| 2 | 0.85 | 0 | 0.00 |
| 3 | 0.70 | 1 | 0.70 |
| 4 | 0.65 | 0 | 0.00 |
| 5 | 0.50 | 1 | 0.50 |
| 6 | 0.50 | 0 | 0.00 |
| 7 | 0.40 | 1 | 0.40 |
| 8 | 0.30 | 0 | 0.00 |
| 9 | 0.20 | 1 | 0.20 |
| 10 | 0.10 | 0 | 0.00 |
| Total Flow Rate | | | 1.80 kg/s |
| Total Uncertainty % | | | 1.00% |
| Total Uncertainty | | | 0.018 kg/s |

TABLE 5

| Well No | Flow Rate (kg/s) | On/Off | Contribution (kg/s) |
|---|---|---|---|
| 1 | 1.00 | 1 | 1.00 |
| 2 | 0.85 | 1 | 0.85 |
| 3 | 0.70 | 0 | 0.00 |
| 4 | 0.65 | 1 | 0.65 |
| 5 | 0.50 | 0 | 0.00 |
| 6 | 0.50 | 1 | 0.50 |
| 7 | 0.40 | 0 | 0.00 |
| 8 | 0.30 | 1 | 0.30 |

TABLE 5-continued

| Well No | Flow Rate (kg/s) | On/Off | Contribution (kg/s) |
|---|---|---|---|
| 9 | 0.20 | 0 | 0.00 |
| 10 | 0.10 | 1 | 0.10 |
| Total Flow Rate | | | 3.40 kg/s |
| Total Uncertainty % | | | 1.00% |
| Total Uncertainty | | | 0.034 kg/s |

Table 6 (below) shows the totals for 1A, 1B, 2A, and 2B, as set forth above. Table 7 (below) shows the calculations (1A−1B) and (2B−2A), and Table 8 shows the calculations {(1A−1B)+(2B−2A)}/2, including an uncertainty percentage.

TABLE 6

| | Step 1 | | Step 2 | |
|---|---|---|---|---|
| | Total (kg/s) | Unc (kg/s) | Total (kg/s) | Unc (kg/s) |
| First Measurement System (110) | 1A = 2.80 | 0.028 | 1B = 1.80 | 0.018 |
| Second Measurement System (112) | 2A = 2.40 | 0.024 | 2B = 3.40 | 0.034 |

TABLE 7

| Differences | Total (kg/s) | Unc (kg/s) |
|---|---|---|
| (1A−1B) | 1.00 | 0.033 |
| (2B−2A) | 1.00 | 0.042 |

TABLE 8

| | Total (kg/s) | Unc (kg/s) | Unc (%) |
|---|---|---|---|
| Well Flow Estimate | 1.00 | 0.027 | 2.66 |

In one example, after calculating the estimate of well 1 flow, the default path of well 1 can be restored. If desired, another well flow estimate for well 1 can be computed in the same way comparing change in flow rates as well 1 is re-routed from its non-default flow path back to its default flow path. For example, the first and second well flow estimates can be averaged to provide a well flow estimate based on more data. After waiting a sufficient time for the default flow to reestablish, flow estimates for the other wells can be sequentially determined in the same manner as set forth above for well 1.

The basic flow rate (e.g., total mass flow from each well) can be computed in the manner set forth above using a wide range of well test systems. However, it is understood that more sophisticated well test systems, such as the well test systems 110, 112 which each include a net oil skid 600 performing Monte Carlo simulated uncertainty analysis can provide well test estimates for each well that includes a more detailed breakout of flow rate and uncertainty for each constituent (e.g., gas, oil, and water) of the multiphase flow from each well 101.

In another example, systematic tests of all the wells 101 could also be carried out by allowing more complex moves away from the default configuration. Thus, as with the example set forth above, the wells 101 can be ranked in order of flow rate, and all odd numbered wells can be grouped into one group which is associated with the first measurement system 110 and all even numbered wells can be grouped in another group associated with the second measurement system 112. The following steps may be executed by the controller:

Well 1 is fluidicly re-routed using its respective valve 104 from the first measurement system 110 to the second measurement system 112, and the flow rate is estimated and recorded for Well 1 in the manner described above;

Well 2 is fluidicly re-routed using its respective valve 104 from the second measurement system 112 to the first measurement system 110, and the flow rate is estimated and recorded for Well 2 in the manner described above;

Well 3 is fluidicly re-routed using its respective valve 104 from the first measurement system 110 to the second measurement system 112, and the flow rate is estimated and recorded for Well 3 in the manner described above;

the valves 104 are used to continue re-routing wells 4 through N one at a time, alternating between (i) re-routing a well from the first measurement system 110 to the second measurement system 112 and (ii) re-routing a well from the second measurement system 112 to the first measurement system 110, with the flow rate for each of wells 4 through N being estimated and recorded in the manner described above after that particular well was re-routed.

Continuing in this way, all N wells can be measured using only N+1 recording periods, where each well is estimated from the difference in flows between consecutive averages. At the end of this process, the odd numbered group originally in fluid communication with the first measurement system 110 is in fluid communication with the second measurement system 112, and vice versa for the even numbered group. Each flow step can be taken to minimize the change in flow rate observed by each measurement system 110, 112 (i.e., no more than one well moving from one side to the other, and always restoring the balance at the next move with the next largest well moving in the other direction), therefore ensuring the least process disruption by the process of measuring wells on an individual basis. Thus in this scenario, there are effectively two 'default positions', with say the first group of wells all in fluid communication with the first measurement system 110, or all in fluid communication with the second measurement system 112, and the second group all on the other measurement system. An efficient means of testing all the wells entails moving from one default position to the other in a succession of steps with a settling period between steps.

Testing can take place on a scheduled basis, or might occur in response to an observed change in the behavior of the whole set of wells 101. For example, if a change in one or more flow parameters (oil, gas, or water flows, for example, water cut, gas/oil ratio) is observed among the whole set of wells 101, then a set of well tests could be commenced to identify which well(s) are responsible for the change. With the Coriolis-based net oil metering skid 600 able to give accurate readings within 5 minutes, it might be possible to identify within an hour or two which well 101 or wells is responsible for any significant change in the productivity of the entire set of wells.

As set forth above, the system 100 may include pressure regulation valves 116, 118. These valves 116, 118 can be used to ensure consistent inlet pressure even as changes in the configuration of wells takes place, to ensure the best possible basis for comparing flow rates. For example, the well test procedure, could be modified accordingly as follows:

(i) record the current flow rates using the first and second measurement system 110, 112, averaged over a suitable duration; record the average pressure at the inlets of the first and second measurement systems;

(ii) using the valves 104, change the path of Well 1 so that is now sent to the second measurement system 112 instead of the first measurement system 110;

(iii) adjust the inlet pressure regulation at the inlets to the first measurement system 110 and the second measurement system 112 to maintain pressure at the previously recorded levels, despite the adjustment in respective flowrates; allow a suitable settling time for the new flow pattern to become established;

(iv) record the flow rates using the first and second measurement system 110, 112 in the new configuration, averaged over a suitable duration; and (v) repeat for the other wells 101.

Regulating the pressure at the inlet to the measurement systems 110, 112 using valve 116, 118 further minimizes the disruption caused to the wells by testing them, and thus helps to maintain consistent flow from the wells at all times.

Having described the invention in detail, it will be apparent that variations are possible without departing from the scope of the invention defined in the appended claims.

For instance, the system 100 described above could be modified to include additional measurement systems adapted to work in parallel with the first and second measurement systems 110, 112. Each time an individual well is to be tested, flow from that individual well is re-routed from one of the multiple measurement systems to a different one of the multiple measurement systems. One or more of the differences in total flow at the two measurement systems involved in the switch can be used in the same manner described above to assess flow from the well under test. Each of the multiple measurement systems can be configured to provide uncertainty estimates, as described above. If one or more of the uncertainty estimates fails to meet pre-defined criteria during testing of a particular well, the test of that well may be rejected as being unreliable and the test may be repeated later in an effort to obtain a more reliable test.

Embodiments of the invention may be implemented with computer-executable instructions. Computer-executable instructions may be organized into one or more computer-executable components or modules. Aspects of the invention may be implemented with any number and organization of such components or modules. For example, aspects of the invention are not limited to any specific computer-executable instructions or the specific components or modules illustrated or suggested in the figures and described herein. Other embodiments of the invention may include different computer-executable instructions or components having more or less functionality than illustrated and described herein.

For purposes of illustration, processors, programs and other executable program components, such as the controller 130, the interface module 609, and other components are sometimes illustrated herein as discrete blocks. It is recognized, however, that such programs and components related to the systems described herein may reside in different storage components and may be executed by data processor(s) of different devices, and different combinations of devices, than those illustrated.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A multi-phase flow metering system for measuring a multi-phase fluid including oil, water, and gas, the system comprising:

a Coriolis mass flow meter adapted to measure mass flow rate and density of the multi-phase fluid;

a water cut meter adapted to measure the water cut of the multi-phase fluid; and a processor configured to determine the oil mass flow rate of the oil, water mass flow rate of the water, and gas mass flow rate of the gas using the mass flow rate and density from the Coriolis meter and the water cut from the water cut meter, wherein the processor is further configured to determine dynamic estimates of the uncertainty of each of the oil mass flow rate, water mass flow rate, and gas mass flow rate, wherein the processor is further configured to determine dynamic estimates of the uncertainty of each of the oil mass flow rate, water mass flow rate, and gas mass flow rate based on Monte Carlo Modeling, and wherein the processor is further configured to determine dynamic estimates of the uncertainty of each of the oil mass flow rate, water mass flow rate, and gas mass flow rate by:

(a) calculating the uncertainty of the apparent mass flow, density and water cut measurements;

(b) selecting values for the apparent mass flow, density, and water cut, where these values are selected from a probability distribution based on the calculated uncertainty of each parameter;

(c) performing a three phase measurement calculation using the values selected in (b) to obtain a simulated oil mass flow rate, simulated water mass flow rate, and simulated gas mass flow rate and recording the simulated mass flow rates;

(d) repeating steps (b) and (c) at least ten times to obtain a corresponding number of simulated mass flow rates for each of the oil mass flow rate, water mass flow rate, and gas mass flow rate;

(e) calculating an average value for each of the oil mass flow rate, water mass flow rate, and gas mass flow rate; and (f) calculating an uncertainty estimate for each of the oil mass flow rate, water mass flow rate, and gas mass flow rate using the simulated mass flow rates.

\* \* \* \* \*